(12) United States Patent
Xi et al.

(10) Patent No.: US 12,221,233 B2
(45) Date of Patent: Feb. 11, 2025

(54) METHOD AND DEVICE FOR DETECTING SATELLITES OF LARGE-SCALE CONSTELLATION THROUGH REVERSE-ORBIT RENDEZVOUS, AND NON-TRANSITORY STORAGE MEDIUM

(71) Applicant: Harbin Institute of Technology, Harbin (CN)

(72) Inventors: Ruichen Xi, Harbin (CN); Fan Wu, Harbin (CN); Xibin Cao, Harbin (CN); Shi Qiu, Harbin (CN); Jinsheng Guo, Harbin (CN); Huayi Li, Harbin (CN)

(73) Assignee: Harbin Institute of Technology, Harbin (CN)

( * ) Notice: Subject to any disclaimer, the term of this patent is extended or adjusted under 35 U.S.C. 154(b) by 2 days.

(21) Appl. No.: 18/498,857

(22) Filed: Oct. 31, 2023

(65) Prior Publication Data
US 2024/0150039 A1    May 9, 2024

(30) Foreign Application Priority Data
Nov. 2, 2022   (CN) .......................... 202211359727.X

(51) Int. Cl.
*B64G 3/00* (2006.01)
*B64G 1/10* (2006.01)

(52) U.S. Cl.
CPC ................ *B64G 1/10* (2013.01); *B64G 3/00* (2013.01)

(58) Field of Classification Search
CPC ........... B64G 1/10; B64G 3/00; B64G 1/1085
See application file for complete search history.

(56) References Cited

U.S. PATENT DOCUMENTS 5,927,652 A * 7/1999 Lansard ................... B64G 1/10
244/158.4
8,511,614 B2 * 8/2013 Robinson ............. B64G 1/1085
244/158.4
(Continued)

FOREIGN PATENT DOCUMENTS

CN        105512374 A      4/2016
CN        106802667 A      6/2017
(Continued)

OTHER PUBLICATIONS

WO 2023247882 (Year: 2023).*
(Continued)

*Primary Examiner* — Brian M O'Hara
(74) *Attorney, Agent, or Firm* — Westbridge IP LLC

(57) ABSTRACT

Disclosed are a method, a device and a non-transitory storage medium. The method includes: deploying a detection satellite to fly in one detection orbital plane opposite to the satellites in the large-scale constellation, to sequentially detect satellites flying in one target orbital plane of the large-scale constellation in a manner that an approach distance between the detection satellite and a satellite being detected is within a set detection distance, transmitting the detection satellite from the one detection orbital plane to another detection orbital plane in virtue of Earth oblateness perturbation, so as to sequentially detect satellites flying in another target orbital plane of the large-scale constellation in a manner that the approach distance between the detection satellite and a satellite being detected is within the set detection distance, and stopping the detection satellite from detecting until all satellites of the large-scale constellation have been detected.

20 Claims, 6 Drawing Sheets deploying a detection satellite to fly in one detection orbital plane in a direction opposite to a flight direction of the satellites in the large-scale constellation, so as to sequentially detect satellites flying in one target orbital plane of the large-scale constellation with the detection satellite in a manner that an approach distance between the detection satellite and a satellite being detected is within a set detection distance — S101 transmitting the detection satellite from the one detection orbital plane to another detection orbital plane in virtue of Earth oblateness perturbation, so as to sequentially detect satellites flying in another target orbital plane of the large-scale constellation with the detection satellite in a manner that the approach distance between the detection satellite and a satellite being detected is within the set detection distance — S102 stopping the detection satellite from detecting until all satellites of the large-scale constellation have been detected — S103

(56) References Cited

U.S. PATENT DOCUMENTS

| | | | | |
|---|---|---|---|---|
| 9,284,074 | B2* | 3/2016 | Hofschuster | F41H 11/02 |
| 11,689,372 | B2* | 6/2023 | Shasha | G06Q 10/087 |
| | | | | 713/176 |
| 2023/0082775 | A1* | 3/2023 | Usuki | G01S 19/40 |
| | | | | 701/469 |
| 2024/0114423 | A1* | 4/2024 | Mukae | H04B 7/18513 |

FOREIGN PATENT DOCUMENTS

| | | | |
|---|---|---|---|
| CN | 109656133 A | 4/2019 | |
| CN | 110032768 A | 7/2019 | |
| CN | 110053788 A | 7/2019 | |
| CN | 110198184 A | 9/2019 | |
| CN | 112591146 A | 4/2021 | |
| CN | 113525719 A | 10/2021 | |
| CN | 113525721 A | 10/2021 | |
| CN | 113636106 A | 11/2021 | |
| CN | 114229038 A | 3/2022 | |
| CN | 115123583 A | 9/2022 | |
| EP | 3960637 A1 | 3/2022 | |
| JP | 2021008220 A | 1/2021 | |
| WO | WO-2023247882 A1 * | 12/2023 | B64G 1/1021 |

OTHER PUBLICATIONS

First Office Action issued in counterpart Chinese Patent Application No. 202211359727.X, dated Dec. 22, 2022.

Li et al., Study of rendezvous angle of counter orbit satellite intercept based on ground TT&C station, Flight Dynamics, 2010, 28(3), pp. 74-77, dated Jun. 30, 2010.

Notification to Grant Patent Right for Invention issued in counterpart Chinese Patent Application No. 202211359727.X, dated Jan. 18, 2023.

Wang et al., Flyaround orbit design and keep control for on-orbit-servicing spacecraft in eccentric orbits, Journal of Jilin University (Engineering and Technology Edition), 2006, 36(3), pp. 410-416, dated May 31, 2006.

* cited by examiner deploying a detection satellite to fly in one detection orbital plane in a direction opposite to a flight direction of the satellites in the large-scale constellation, so as to sequentially detect satellites flying in one target orbital plane of the large-scale constellation with the detection satellite in a manner that an approach distance between the detection satellite and a satellite being detected is within a set detection distance — S101 transmitting the detection satellite from the one detection orbital plane to another detection orbital plane in virtue of Earth oblateness perturbation, so as to sequentially detect satellites flying in another target orbital plane of the large-scale constellation with the detection satellite in a manner that the approach distance between the detection satellite and a satellite being detected is within the set detection distance — S102 stopping the detection satellite from detecting until all satellites of the large-scale constellation have been detected — S103

FIG. 1

METHOD AND DEVICE FOR DETECTING SATELLITES OF LARGE-SCALE CONSTELLATION THROUGH REVERSE-ORBIT RENDEZVOUS, AND NON-TRANSITORY STORAGE MEDIUM

CROSS-REFERENCE TO RELATED APPLICATION

The present application is based on and claims priority to Chinese Patent Application No. 202211359727.X, filed on Nov. 2, 2022, the disclosure of which is hereby incorporated by reference in its entirety.

BACKGROUND

With the rapid development of technology for mass production of satellites, more and more institutions around the world are constructing or planning to construct a large-scale constellation composed of dozens or even tens of thousands of satellites to provide various application services such as remote sensing, communication, navigation, etc. that can cover the Earth. The large-scale constellation typically has several orbital planes in each one of which a plurality of satellites fly. In order to detect the detailed operational status of all satellites of the large-scale constellation in a short period of time to meet the needs of monitoring and analyzing the health condition thereof for example, it is necessary to use detection satellites to approach each satellite in the large-scale constellation so as to perform detection.

The traditional approach detection method is usually suitable for a single target satellite, since a detection satellite needs to follow the target satellite by adopting orbital parameters similar to those of the target satellite. As for the massive satellites of a large-scale constellation, when the detection satellite completes the detection of one target satellite by accompanying it in a short distance, it usually needs to adjust its own orbital phase or orbital plane through orbital maneuver, only in this way can the detection satellite continue to detect the next target satellite by accompanying it in a short distance. Due to the fact that orbital maneuvers consume a large amount of fuel, and the weight of fuel that the detection satellite can carry is limited, the above detection method will greatly limit the number of target satellites that can be detected by a single detection satellite, thus making it difficult to complete detection of each satellite of the large-scale constellation, or causing a significant increase in detection costs.

SUMMARY

The present application relates to the technical field of satellite applications, particularly relates to a method and a device for detecting satellites of a large-scale constellation through reverse-orbit rendezvous, and a non-transitory storage medium.

In view of the issues described above, the present disclosure provides a method and a device for detecting satellites of a large-scale constellation through reverse-orbit rendezvous, and a non-transitory storage medium, which enable the detection of all satellites in the large-scale constellation to be completed without consuming fuel or only consuming less fuel.

According to a first aspect of the present disclosure, a method for detecting satellites of a large-scale constellation through reverse-orbit rendezvous is provided. The method includes:

deploying a detection satellite to fly in one detection orbital plane in a direction opposite to the flight direction of the satellites in the large-scale constellation, so as to sequentially detect satellites flying in one target orbital plane of the large-scale constellation with the detection satellite in a manner that an approach distance between the detection satellite and a satellite being detected is within a set detection distance, transmitting the detection satellite from the one detection orbital plane to another detection orbital plane in virtue of Earth oblateness perturbation, so as to sequentially detect satellites flying in another target orbital plane of the large-scale constellation with the detection satellite in a manner that the approach distance between the detection satellite and a satellite being detected is within the set detection distance, and stopping the detection satellite from detecting until all satellites of the large-scale constellation have been detected.

According to a second aspect of the present disclosure, a device for detecting satellites of a large-scale constellation through reverse-orbit rendezvous is provided. The device includes:

a deploying part, which is configured for deploying a detection satellite to fly in one detection orbital plane in a direction opposite to a flight direction of the satellites in the large-scale constellation, so as to sequentially detect satellites flying in one target orbital plane of the large-scale constellation with the detection satellite in a manner that an approach distance between the detection satellite and a satellite being detected is within a set detection distance, a transmitting part, which is configured for transmitting the detection satellite from the one detection orbital plane to another detection orbital plane in virtue of Earth oblateness perturbation, so as to sequentially detect satellites flying in another target orbital plane of the large-scale constellation with the detection satellite in a manner that the approach distance between the detection satellite and a satellite being detected is within the set detection distance, and a stopping part, which is configured for stopping the detection satellite from detecting until all satellites of the large-scale constellation have been detected.

According to a third aspect of the present disclosure, a non-transitory storage medium is provided. The non-transitory storage medium has stored thereon computer-readable instructions that, when executed by a processor, cause the processor to perform the method for detecting satellites of a large-scale constellation through reverse-orbit rendezvous as described in the first aspect.

The disclosure provides a method and a device for detecting satellites of a large-scale constellation through reverse-orbit rendezvous, and a non-transitory storage medium. Due to the fact that the flight direction of the detection satellite is opposite to that of the target satellites, approaching, rendezvousing with and thus detecting all target satellites in the same target orbital plane with the same orbital height and inclination can be achieved by using only one detection satellite without consuming fuel or only consuming less fuel. Besides, due to the use of the Earth oblateness perturbation, the detection satellite can complete the transfer of the detection orbital plane in a relatively short period of time without consuming fuel or only consuming less fuel, thereby continuing to approach, rendezvous with and thus detect target satellites on other target orbital planes.

BRIEF DESCRIPTION OF THE DRAWINGS

FIG. 1 is a schematic flow chart of a method for detecting satellites of a large-scale constellation through reverse-orbit rendezvous according to an embodiment of the present application.

DETAILED DESCRIPTION OF THE EMBODIMENTS

In the following, the present application will be described clearly and completely by way of exemplary embodiments in conjunction with the accompanying drawings.

Referring to FIG. 1, it shows a method for detecting satellites of a large-scale constellation through reverse-orbit rendezvous according to an embodiment of the present application. The method includes the following steps:

S101: deploying a detection satellite to fly in one detection orbital plane in a direction opposite to a flight direction of the satellites in the large-scale constellation, so as to sequentially detect satellites flying in one target orbital plane of the large-scale constellation with the detection satellite in a manner that an approach distance between the detection satellite and a satellite being detected is within a set detection distance, S102: transmitting the detection satellite from the one detection orbital plane to another detection orbital plane in virtue of Earth oblateness perturbation, so as to sequentially detect satellites flying in another target orbital plane of the large-scale constellation with the detection satellite in a manner that the approach distance between the detection satellite and a satellite being detected is within the set detection distance, and S103: stopping the detection satellite from detecting until all satellites of the large-scale constellation have been detected.

Figure 2:
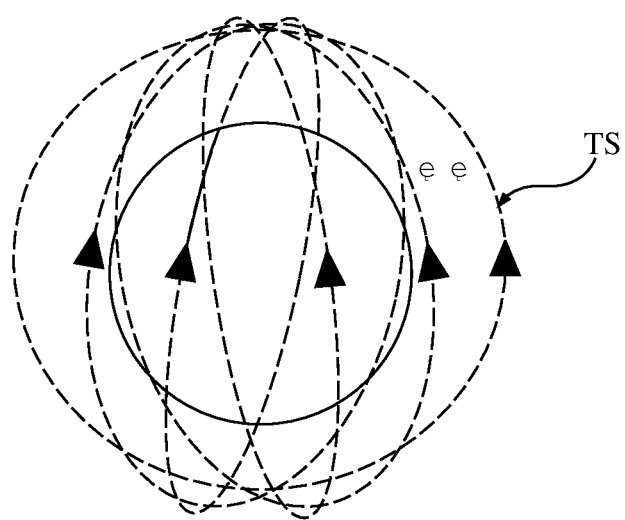
FIG. 2 is a schematic diagram of the distribution of target orbital planes where the satellites of the large-scale constellation are located according to an embodiment of the present application.
Figure 3:
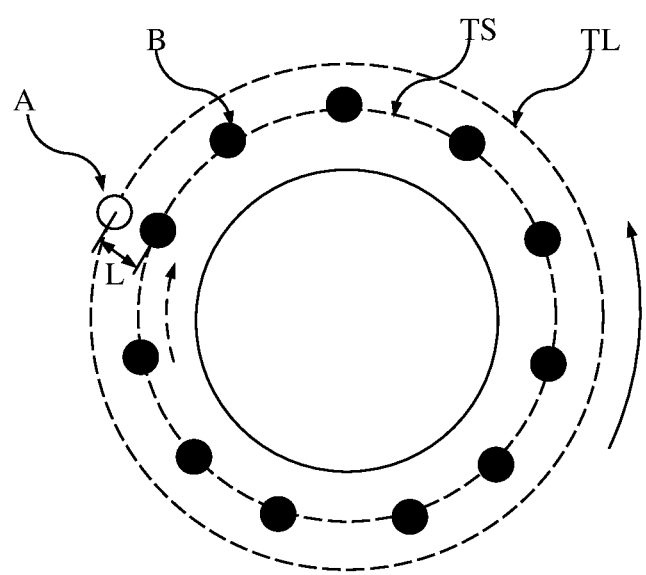
FIG. 3 is a schematic diagram of a situation where a detection satellite performs approach-rendezvous detection above the satellite being detected according to an embodiment of the present application.
Figure 4:
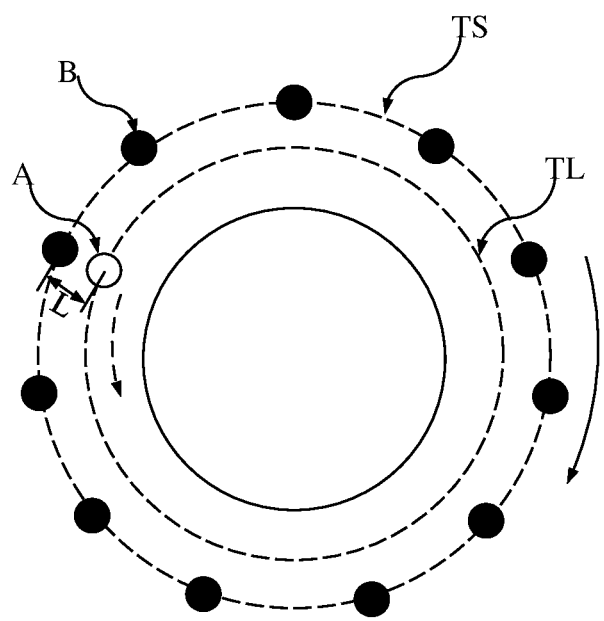
FIG. 4 is a schematic diagram of a situation where the detection satellite performs approach-rendezvous detection below the satellite being detected according to an embodiment of the present application.

Specifically, referring to FIG. 2, it shows the distribution of target orbital planes TS where the satellites of the large-scale constellation are located according to an embodiment of the present application. In FIG. 2, the solid line circle represents the Earth, and the dotted line circles represent the target orbital planes. It can be seen from FIG. 2 that the multiple target orbital planes TS are all close to circular, and have the same orbital height $h_T$, the same orbital inclination $i_T$, and different right ascension of ascending nodes $\Omega_T$. During a large-scale constellation deployment, multiple satellites are deployed on each target orbital plane TS. Referring to FIG. 3 and FIG. 4 which show the flight directions of the detection satellite A and the target satellite B respectively during the specific detection process according to an embodiment of the present application. Specifically, FIG. 3 shows that the detection satellite A performs approach-rendezvous detection above the target satellite B, and FIG. 4 shows that the detection satellite A performs approach-rendezvous detection below the target satellite B.

Based on the above description, for the technical solution shown in FIG. 1, in some possible implementations, an orbital height of a detection orbital plane where the detection satellite is located is determined based on an orbital height of a target orbital plane associated therewith to be:

$$h_s = \begin{cases} h_T + L \\ h_T - L \end{cases} \quad (1)$$

in the above formula, $h_T$ represents the orbital height of the target orbital plane, $h_S$ represents the orbital height of the detection orbital plane, L represents the approach distance between the detection satellite and the satellite being detected, when the detection satellite performs approach-rendezvous detection above the satellite being detected, $h_S=h_T+L$, and when the detection satellite performs approach-rendezvous detection below the satellite being detected, $h_S=h_T-L$, wherein an orbital inclination of the detection orbital plane where the detection satellite is located is determined based on an orbital inclination of the target orbital plane associated therewith to be:

$$i_S = 180° - i_T \quad (2)$$

in the above formula, $i_T$ represents the orbital inclination of the target orbital plane, $i_S$ represents the orbital inclination of the detection orbital plane, and wherein a right ascension of ascending node of the detection orbital plane where the detection satellite is located is determined based on a right ascension of ascending node of the target orbital plane associated therewith to be:

$$\Omega_S = \begin{cases} \Omega_T + 180° & 0° \leq \Omega_T < 180° \\ \Omega_T - 180° & 180° \leq \Omega_T < 360° \end{cases} \quad (3)$$

in the above formula, $\Omega_T$ represents the right ascension of ascending node of the target orbital plane, $\Omega_S$ represents the right ascension of ascending node of the detection orbital plane.

It can be understood that if the detection satellite A performs approach-rendezvous detection to the target satellite on the first target orbital plane TS-1 with a right ascension of ascending node of $\Omega_{T1}$, the right ascension of ascending node of the first detection orbital plane TL-1 where the detection satellite A is located is represented as:

$$\Omega_{S1} = \begin{cases} \Omega_{T1} + 180° & 0° \leq \Omega_{T1} < 180° \\ \Omega_{T1} - 180° & 180° \leq \Omega_{T1} < 360° \end{cases}$$

in the above formula, $\Omega_{T1}$ represents the right ascension of ascending node of the first target orbital plane, $\Omega_{S1}$ represents the right ascension of ascending node of the first detection orbit plane where the detection satellite detects the target satellite in the first target orbital plane.

For the technical solution shown in FIG. 1, in some possible implementations, the number of the detection satellite is one.

It can be understood that in the specific implementation process of the embodiment of the present application, the target satellites B on the target orbital plane TS can be detected sequentially in a manner that only one detection satellite A flies in a direction opposite to the flight direction of the target satellites B.

For the technical solution shown in FIG. 1, in some possible implementation manners, a detection time of the detection satellite for each target orbital plane is no more than half of a detection period.

For the above possible implementation manners, in some examples, within the detection period, the detection satellite performs two approach-rendezvous detections on each satellite in each of target orbital planes at most.

For example, if the orbital period of the target orbital plane TS where the target satellites B are located is $T_T$, and the orbital period of the detection orbital plane TL where the detection satellite A is located is $T_S$, then the detection period for detecting the current target orbital plane TS by the detection satellite A is T=max $\{T_T, T_S\}$. When the approach distance L is not too large, $T_T \approx T_s \approx T$. Based on this, the detection time t to complete a single rendezvous detection of all target satellites B on the current target orbital plane TS is at most $$\frac{T_T T_S}{T_T + T_S}, \text{ and } \frac{T_T T_S}{T_T + T_S}$$

slightly less than $$\frac{1}{2}T,$$

so all target satellites B on the current target orbital plane TS can be rendezvoused and detected twice within the detection period. That is to say, as long as the change of the approach distance L between the detection satellite A and the target satellite B can still meet the detection requirements, the detection satellite A can still complete two detections of all target satellites B on the current target orbital plane TS within the detection period.

Taking the detection of all target satellites B on the first target orbital plane TS-1 by the detection satellite A as an example, after the detection satellite A completes the first approach-rendezvous detection of the first target satellite on the first target orbital plane TS-1, the detection satellite A sequentially approaches, rendezvouses with and thus detects other target satellites B on the first target orbital plane TS-1, the detection time t for a single rendezvous detection of all target satellites B on the first target orbital plane TS-1 shall not exceed half of the detection period. It should be noted that the above-mentioned detection period refers to the maximum value of the orbital period $T_S$ of the detection orbital plane TL and the orbital period $T_T$ of the target orbital plane TS. Besides, during the detection process, as long as the approach distance L between the detection satellite A and the target satellite B is within the set detection distance range, the target satellite B on the first orbital plane TS-1 can still be approached, rendezvoused and detected multiple times.

Of course, it should be noted that in the embodiment of the present application, the number of detection satellites A may also be increased so as to, for example, speed up the detection speed according to specific actual conditions.

For the technical solution shown in FIG. 1, in some possible implementation manners, transmitting the detection satellite from the one detection orbital plane to the other detection orbital plane in virtue of the Earth oblateness perturbation is achieved in a manner that a right ascension of ascending node of a detection orbital plane where the detection satellite is located is changed from $\Omega_{S1}$ to $\Omega_{S2}$, wherein $$\Omega_{S2} = \begin{cases} \Omega_{T2} + 180° & 0° \leq \Omega_{T2} < 180° \\ \Omega_{T2} = 180° & 180° \leq \Omega_{T2} < 360° \end{cases}$$

in the above formula, $\Omega_{T2}$ represents a right ascension of ascending node of the other target orbital plane, $\Omega_{S2}$ represents a right ascension of ascending node of the other detection orbital plane where the detection satellite is located to detect satellites in the other target orbital plane, $\Omega_{S1}$ represents a right ascension of ascending node of the one detection orbital plane where the detection satellite is located to detect satellites in the one target orbital plane.

It can be understood that in virtue of the Earth oblateness perturbation, the detection satellite A can naturally drift from the first detection orbital plane TL-1 whose right ascension of ascending node is $\Omega_{S1}$ to the second one whose right ascension of ascending node is $\Omega_{S2}$, so as to perform rendezvous detection of the target satellites on the second target orbital plane TS-2 whose right ascension of ascending node is $\Omega_{T2}$.

For the technical solution shown in FIG. 1, in some possible implementations, a daily relative change in right ascension of ascending node between a detection orbital plane where the detection satellite is located and a target orbital plane where satellites to be detected are located caused by the Earth oblateness perturbation is:

$$(\Delta\Omega_{ST})_{day} = -9.964° \times \left( \frac{\left(\frac{R_\oplus}{a_S}\right)^{\frac{7}{2}}}{(1-e_S^2)^2} \times \cos i_S - \frac{\left(\frac{R_\oplus}{a_T}\right)^{\frac{7}{2}}}{(1-e_T^2)^2} \times \cos i_T \right) \quad (4)$$

in the above formula, $(\Delta\Omega_{ST})_{day}$ represents the daily relative change in right ascension of ascending node between the detection orbital plane where the detection satellite is located and the target orbital plane where the satellites to be detected are located, $R_\oplus$ represents a radius of the Earth, $a_S$ represents a length of a semi-major axis of the detection orbital plane where the detection satellite is located, $a_T$ represents a length of a semi-major axis of the target orbital plane where the satellites to be detected is located, $e_S$ represents an orbital eccentricity of the detection orbital plane, $e_T$ represents an orbital eccentricity of the target orbital plane, $i_T$ represents an orbital inclination of the target orbital plane, $i_s$ represents an orbital inclination of the detection orbital plane, if $(\Delta\Omega_{ST})_{day}$ is negative, the detection orbital plane where the detection satellite is located shifts westward relative to the target orbital plane where the satellites to be detected are located, if $(\Delta\Omega_{ST})_{day}$ is positive, the detection orbital plane where the detection satellite is located shifts eastward relative to the target orbital plane where the satellites to be detected are located.

It should be noted that the non-uniform gravitational field generated due to the uneven distribution of the Earth's mass will cause the right ascension of ascending node of the detection orbital plane TL where the detection satellite A is located to change. By adopting the reverse-orbit rendezvous detection method provided by the embodiments of the present application, the detection satellite A can use the Earth oblateness perturbation to complete the natural drift from the detection orbital plane TL where it is located without consuming fuel or with less fuel, so that the right ascension of ascending node of the detection orbital plane TL can be adjusted from $\Omega_{S1}$ to $\Omega_{S2}$ in a short period of time, so as to perform rendezvous detection on the target satellite B on the second orbital plane TS-2 whose right ascension of ascending node is $\Omega_{T2}$.

In addition, it is understandable that in the potential function of the Earth's gravitational field, the factor J2 which is called "Earth oblate perturbation" has the greatest impact on the orbit. The change in right ascension of ascending node of the satellite caused by the Earth oblateness perturbation is:

$$(\Delta\Omega)_{day} = -9.964° \times \frac{\left(\frac{R_\oplus}{a}\right)^{\frac{7}{2}}}{(1-e^2)^2} \times \cos i \quad (5)$$

in the above formula, $(\Delta\Omega)_{day}$ represents the daily variation of the right ascension of ascending node of the satellite caused by the Earth oblateness perturbation, $R_\oplus$ represents the radius of the Earth, $R_\oplus$=6378.140 Km, a represents the semi-major axis of the satellite's orbit, e represents the eccentricity of the satellite's orbit, for a near-circular orbit, e≈0, i indicates the orbital inclination of the satellite.

In the embodiment of the present application, since cos $i_S$=−cos $i_T$, then the daily relative change in right ascension of ascending node between the detection orbital plane TL where the detection satellite A is located and the target orbital plane TS where the target satellites B to are located is:

$$(\Delta\Omega_{ST})_{day} = -9.964° \times \left(\frac{\left(\frac{R_\oplus}{a_S}\right)^{\frac{7}{2}}}{(1-e_S^2)^2} \times \cos i_S - \frac{\left(\frac{R_\oplus}{a_T}\right)^{\frac{7}{2}}}{(1-e_T^2)^2} \times \cos i_T\right)$$

$$= 9.964° \times \left(\left(\frac{R_\oplus}{a_S}\right)^{\frac{7}{2}} + \left(\frac{R_\oplus}{a_T}\right)^{\frac{7}{2}}\right) \times \cos i_T$$

Understandably, if $i_T$<90°, then the detection orbital plane TL of the detection satellite A shifts eastward relative to the target orbital plane TS of the target satellite B, if $i_T$=90°, then there is no relative shift between the detection orbital plane TL of the detection satellite A and the target orbital plane TS of the target satellite B, if $i_T$>90°, then the detection orbital plane TL of the detection satellite A shifts westward relative to the target orbital plane TS of the target satellite B.

It can be seen that for the target satellite B whose orbital inclination $i_T$ is not 90°, especially in the low-inclination target orbital plane, compared with the traditional detection method in which the detection satellite A accompanies the target satellite B and $(\Delta\Omega_{ST})_{day}$≈0, by adopting the reverse-orbit rendezvous detection method provided by the embodiments of the present application, the natural shift of the detection orbital plane TL where the detection satellite A is located can be completed in virtue of the Earth oblateness perturbation without consuming fuel or with less fuel in a short detection time t, so as to realize fast traversal detection.

For the technical solution shown in FIG. 1, in some possible implementations, detecting satellites of the large-scale constellation with the detection satellite includes:

the detection satellite chasing a satellite to be detected with high dynamics, after an attitude of the detection satellite is stable and before a detection range of the detection satellite covers the satellite to be detected, the detection satellite tracking the satellite to be detected with high dynamics in an accurate and stable manner, and after the detection range of the detection satellite covers the satellite to be detected and the detection satellite continuously and stably tracks the satellite to be detected, the detection satellite performing detection of the satellite to be detected.

Figure 5:
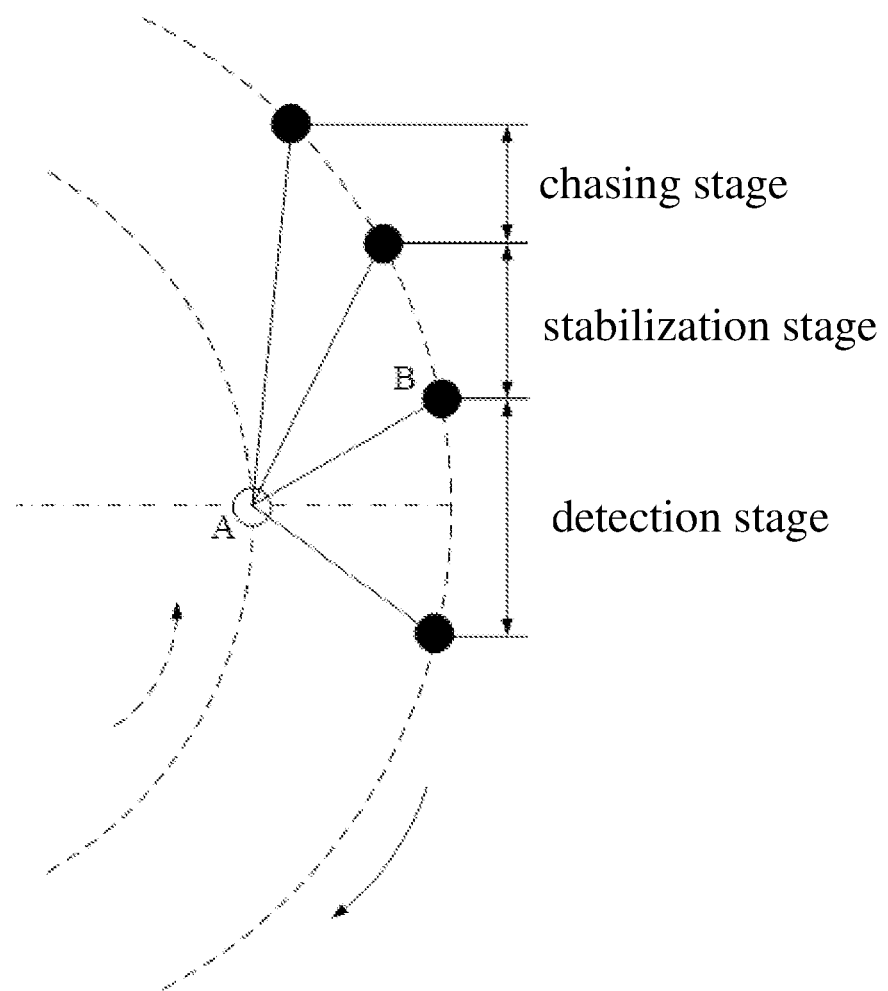
FIG. 5 is a schematic diagram of a process in which the detection satellite performs approach-rendezvous detection of a target satellite according to an embodiment of the present application.

Specifically, as shown in FIG. 5 which shows the detection process of the detection satellite A. First, the detection satellite A chases the target satellite B to be detected with high dynamics, laser ranging and optical composite guidance can be used to achieve high-dynamic chase operations, which corresponds to the chasing stage in FIG. 5, secondly, after the attitude of the detection satellite A is stable and before the detection range of the detection satellite A covers the target satellite B, the detection satellite A achieves accurate and stable track of the target satellite B to be detected with high dynamics, specifically, the detection satellite A can use a combination of a thruster and a reaction flywheel to perform high-precision stable tracking, which corresponds to the stabilization stage in FIG. 5, finally, when the detection satellite A continuously and stably tracks the satellite B to be detected, the detection task is performed, which corresponds to the detection stage in FIG. 5. It can be understood that, compared with the along-orbit rendezvous detection method, the reverse-orbit rendezvous detection method has a faster relative flight speed between the detection satellite A and the target satellite B, which puts higher requirements on the detection process. In the case of the ground station guidance is limited by the geographical location of the ground station, it is impossible to detect the satellites of the large-scale constellation, thus the detection satellite A is required to have the ability of autonomous chasing and tracking.

The technical solution of the present application will be described in detail below with specific examples.

It is assumed that the large-scale constellation contains 1800 target satellites B, which are respectively deployed on 60 near-circular target orbital planes TS with an orbital height h T of 500 Km and an orbital inclination of 50°. The right ascensions of the ascending nodes of these target orbital planes TS are respectively 0°, 6°, 12°, ..., 354°, and each target orbital plane contains 30 target satellites B whose phases are evenly distributed.

It is assumed that the detection satellite A approaches and rendezvous with the target satellite B 5 Km below it, and starts detection from the first target satellite B on the first target orbital plane TS–1 whose right ascension of ascending node is 0°. It can be known that at this time, the orbital height and the orbital inclination of the first detection orbital plane TL–1 of the detection satellite A are 495 Km and 130° respectively, and the right ascension of ascending node $\Omega_{S1}$ of the first detection orbital plane TL–1 is 180°.

In addition, the orbital period $T_T$ of the first target orbital plane TS–1 where the target satellite B is located is set to 5677.0 s, and the orbital period of the first detection orbital plane TL–1 where the detection satellite A is located is set to 5670.8 s. Therefore, it can be known that the detection satellite A can complete the rendezvous detection of a target satellite every 94.6 s. Therefore, for all target satellites B on the first target orbital plane TS–1, starting from the first rendezvous detection of the first target satellite B, it takes 2742.4 s (less than half of one detection period) to complete single rendezvous detection of all target satellites B on the first target orbital plane TS–1, and it takes 5579.3 s (less than one detection period) to complete two rendezvous detections of all target satellites B on the first target orbital plane TS–1. Although during the detection process, the drift of the right ascension of ascending node caused by the Earth oblateness perturbation will gradually separate the first detection orbital plane TL–1 where the detection satellite B is located from the first target orbital plane TS–1, as long as the approach distance L between the detection satellite A and the target satellite B still satisfies the set detection distance range in short term, the detection satellite A can still perform two rendezvous detections on each target satellite B within the detection period.

According to formula (5), it can be calculated that the daily relative variation of the right ascension of ascending node between the detection orbital plane TL where the detection satellite A is located and the target orbital plane TS where the target satellites B are located is 9.8484°/day, that is, without consuming fuel, the detection satellite A can approach and detect the target satellite on the adjacent target orbital plane TS with an interval of 6° in the right ascension of ascending node every 14.62 hours. Regardless of the fuel weight consumed to maintain the orbital altitude, a single detection satellite A can complete the traversal detection of a total of 1,800 target satellites B on 60 target orbital planes within 36 days without consuming fuel.

Of course, in the actual detection process, if the detection speed needs to be further accelerated, the detection satellite A can consume a small amount of fuel to speed up the drift speed when the right ascension of ascending node of the detection orbital plane TL shifts, and of course, multiple detection satellites A can also be deployed simultaneously to perform detection tasks. For example, for the above-mentioned detection tasks, the shift of the detection orbital plane TL can be directly completed by consuming propellant to provide detection satellite A with a velocity pulse of 0.80 Km/s, if less propellant is consumed to provide detection satellite A with less velocity pulse, and the shift of the detection orbital plane can also be completed in less than 14.62 hours. If two detection satellites A are deployed, the interval of the right ascension of ascending node therebetween is 180°, and the two detection satellites A perform detection tasks at the same time, the traversal detection of all 1,800 target satellites B can be completed within 18 days, if three detection satellites A are deployed, the interval of the right ascension of ascending node therebetween is 60°, and the three detection satellites A perform detection tasks at the same time, then the traversal detection of all 1,800 target satellites B can be completed within 6 days.

Through the reverse-orbit rendezvous detection method provided by the embodiment of the present application, the detection satellite A and the target satellite B perform reverse-orbit rendezvous, that is to say, the orbital inclination $i_S$ of the detection orbital plane TL where the detection satellite A is located and the orbital inclination $i_T$ of the target orbital plane TS where the target satellite B is located are complementary to each other. When the rendezvous between the detection satellite A and the target satellite B is achieved in the opposite flight direction, and without consuming fuel or with less fuel, a single approach-rendezvous detection of all target satellites on the same target orbital plane with the same orbital altitude and orbital inclination can be completed in less than half a detection period by only one detection satellite A, besides, approach-rendezvous detection of the same target satellite can be performed repeatedly. After completing the detection tasks of all target satellites on a target orbital plane, the detection satellite A can complete the shift of the detection orbital plane thereof in virtue of the Earth oblateness perturbation in a short period of time without consuming fuel or only consuming less fuel, so as to continue performing approach-rendezvous detection of the target satellites B on other target orbital planes.

Figure 6:
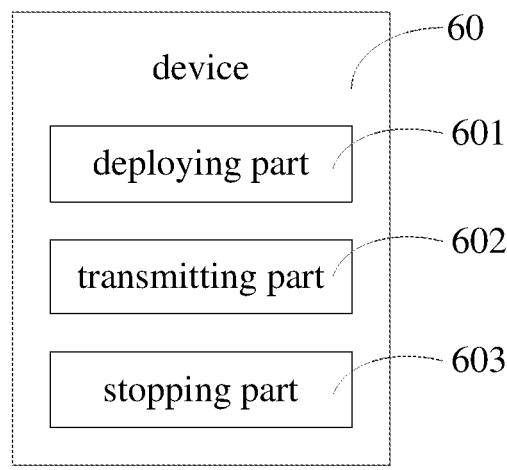
FIG. 6 is a schematic diagram of a device for detecting satellites of a large-scale constellation through reverse-orbit rendezvous according to an embodiment of the present application.

Based on the same inventive concept as that in the above technical solution, as shown in FIG. 6, a device 60 for detecting satellites of a large-scale constellation through reverse-orbit rendezvous is provided according to an embodiment of the present application. The device 60 includes:
- a deploying part 601, which is configured for deploying a detection satellite to fly in one detection orbital plane in a direction opposite to a flight direction of the satellites in the large-scale constellation, so as to sequentially detect satellites flying in one target orbital plane of the large-scale constellation with the detection satellite in a manner that an approach distance between the detection satellite and a satellite being detected is within a set detection distance,
- a transmitting part 602, which is configured for transmitting the detection satellite from the one detection orbital plane to another detection orbital plane in virtue of Earth oblateness perturbation, so as to sequentially detect satellites flying in another target orbital plane of the large-scale constellation with the detection satellite in a manner that the approach distance between the detection satellite and a satellite being detected is within the set detection distance, and
- a stopping part 603, which is configured for stopping the detection satellite from detecting until all satellites of the large-scale constellation have been detected.

It should be explained that for the specific implementation of or the example for embodying the functions for which the above components are configured, reference can be made to the corresponding steps, implementations and examples in the aforementioned technical solutions, which will be not described in detail in the embodiment of the present application.

It could be understood that in the embodiment, "part" can be a circuit part, a processor part, a program or software part, etc., and of course, can also be a unit, or can be a module or non-modular.

Moreover, in the embodiment, all the components can be integrated in a single processing unit, or each component can exist physically separately, or two or more of the components can be integrated in a single unit. The integrated unit can be implemented either in the form of hardware or in the form of software functional modules.

If the integrated unit is implemented in the form of software functional module and is not sold or used as an independent product, it can be stored in a computer-readable non-transitory storage medium. Based on this understanding, the part of the technical solution in the embodiment that makes substantial contributions to the prior art or the whole or part of the technical solution can be embodied in the form of a computer software product. This computer software product is stored in a non-transitory storage medium, including several instructions for making a computer device (which could be a personal computer, server, or network device, etc.) or a processor execute all or part of the steps of the method described in the embodiment. The aforementioned non-transitory storage medium includes USB flash drive, portable hard drive, read-only memory (ROM), random access memory (RAM), magnetic disk or optical disk, and various other mediums that can store program code.

Therefore, a non-transitory storage medium is provided according to an embodiment of the present application, which has stored thereon computer-readable instructions that, when executed by a processor, cause the processor to perform the method for detecting satellites of a large-scale constellation through reverse-orbit rendezvous in the aforementioned technical solution.

Figure 7:
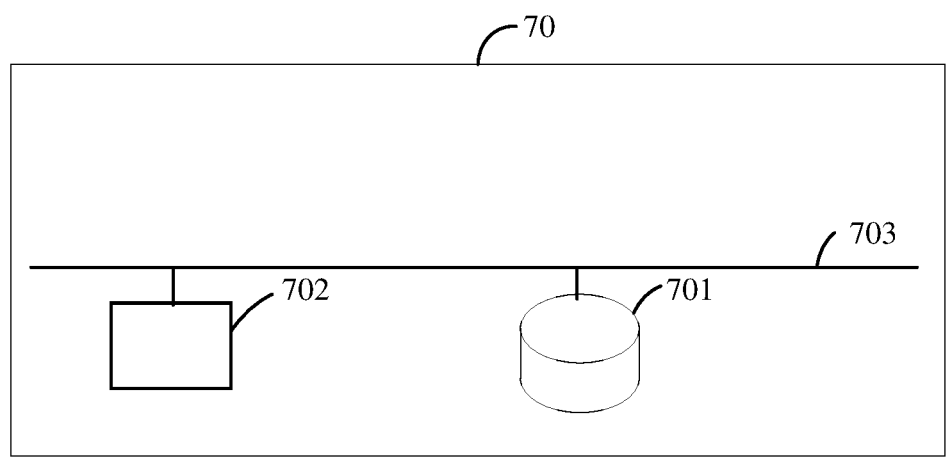
FIG. 7 is a schematic diagram of an apparatus for detecting satellites of a large-scale constellation through reverse-orbit rendezvous according to an embodiment of the present application.

According to the device 60 and the storage medium for detecting satellites of a large-scale constellation through reverse-orbit rendezvous, as shown in FIG. 7, as a specific hardware structure, an apparatus 70 for detecting satellites of a large-scale constellation through reverse-orbit rendezvous is provided according to an embodiment of this application. The apparatus 70 may include a memory 701 and a processor 702, the memory 701 and the processor 702 can be coupled together through a bus system 703. It could be understood that the bus system 703 is used for the connection communication between the memory 701 and the processor 702. The bus system 703 includes not only a data bus but also a power bus, a control bus, and a status signal bus. However, for the sake of clarity, all these kinds of buses are referred to as the bus system 703 in FIG. 7.

The memory 701 is configured for storing computer-readable instructions capable of running on the processor 702.

The processor 702 is configured for performing the following steps by running the computer-readable instructions:
deploying a detection satellite to fly in one detection orbital plane in a direction opposite to a flight direction of the satellites in the large-scale constellation, so as to sequentially detect satellites flying in one target orbital plane of the large-scale constellation with the detection satellite in a manner that an approach distance between the detection satellite and a satellite being detected is within a set detection distance,
transmitting the detection satellite from the one detection orbital plane to another detection orbital plane in virtue of Earth oblateness perturbation, so as to sequentially detect satellites flying in another target orbital plane of the large-scale constellation with the detection satellite in a manner that the approach distance between the detection satellite and a satellite being detected is within the set detection distance, and
stopping the detection satellite from detecting until all satellites of the large-scale constellation have been detected.

It could be understood that in the embodiment, the memory 701 can be either a volatile memory or a non-volatile memory, or include both a volatile memory and a non-volatile memory. Non-volatile memory can be Read-Only Memory (ROM), Programmable ROM (PROM), Erasable PROM (EPROM), Electrically EPROM (EEPROM), or flash memory. Volatile memory can be Random Access Memory (RAM), which is used as external high-speed cache. As illustrative examples, but not limited thereto, many forms of RAM can be used, such as static RAM (SRAM), dynamic RAM (DRAM), synchronous DRAM (SDRAM), double data rate SDRAM (DDRSDRAM), enhanced SDRAM (ESDRAM), synchlink DRAM (SLDRAM), and direct rambus RAM (DRRAM). The memory 701 mentioned in the system and method described herein is intended to include but not limited to these and any other suitable types of memory.

The processor 702 can be an integrated circuit chip with signal processing capability. In the implementation, the various steps of the above method can be completed by an integrated logic circuit in the form of hardware in the processor 702 or instructions in the form of software. The processor 702 can be a general-purpose processor, digital signal processor (DSP), application-specific integrated circuit (ASIC), field-programmable gate array (FPGA), or other programmable logic devices, discrete gates, transistor logic devices, discrete hardware components, or any combination thereof. The general-purpose processor may be a microprocessor or the processor may also be any conventional processor, etc. The disclosed methods in the embodiment of the present application can be executed directly by the hardware in a decoding processor, or can be executed by the combination of the hardware or software modules in a decoding processor. The software module can exist in common storage media such as random-access memory, flash memory, read-only memory, programmable read-only memory, electrically erasable programmable memory or registers. The non-transitory storage medium is in the memory 701, and the processor 702 reads the information from the memory 701 and executes the above method in conjunction with its hardware.

It could be understood that the embodiments described herein can be implemented using hardware, software, firmware, middleware, microcode, or a combination thereof. For the implementation in hardware, the processing unit can be implemented in one or more application specific integrated circuits (ASICs), digital signal processors (DSPs), DSP devices (DSPDs), programmable logic devices (PLDs), field-programmable gate arrays (FPGAs), general-purpose processors, controllers, microcontrollers, microprocessors, other electronic units for performing the functions disclosed herein, or a combination thereof.

For the implementation in software, the method described herein can be implemented using modules (e.g., procedures, functions, etc.) that perform the functions described herein. The software code can be stored in the memory and executed by the processor. The memory can be implemented inside or outside the processor.

It should be known that any combination of the technical solutions disclosed in the embodiments of the present application can be made without conflict.

While the present application has been described with reference to the exemplary embodiments, it should be understood that the present application is not limited to the specific embodiments/examples described and illustrated in detail herein, and those skilled in the art can image any variation or substitution of the exemplary embodiments without departing from the protection scope defined by the claims.

What is claimed is:

1. A method for detecting satellites of a large-scale constellation through reverse-orbit rendezvous, comprising:
    deploying a detection satellite to fly in one detection orbital plane in a direction opposite to a flight direction of the satellites in the large-scale constellation, so as to sequentially detect satellites flying in one target orbital plane of the large-scale constellation with the detection satellite in a manner that an approach distance between the detection satellite and a satellite being detected is within a set detection distance,
    transferring the detection satellite from the one detection orbital plane to another detection orbital plane in virtue of Earth oblateness perturbation, so as to sequentially detect satellites flying in another target orbital plane of the large-scale constellation with the detection satellite in a manner that the approach distance between the detection satellite and a satellite being detected is within the set detection distance, and
    stopping the detection satellite from detecting after all satellites of the large-scale constellation have been detected.

2. The method according to claim 1, wherein an orbital height of a detection orbital plane where the detection satellite is located is determined based on an orbital height of a target orbital plane associated therewith to be:

$$h_S = \begin{cases} h_T + L \\ h_T - L \end{cases}$$

wherein $h_T$ represents the orbital height of the target orbital plane, $h_S$ represents the orbital height of the detection orbital plane, L represents the approach distance between the detection satellite and the satellite being detected, when the detection satellite performs approach-rendezvous detection above the satellite being detected, $h_s = h_T + L$, and when the detection satellite performs approach-rendezvous detection below the satellite being detected, $h_s = h_T - L$,
wherein an orbital inclination of the detection orbital plane where the detection satellite is located is determined based on an orbital inclination of the target orbital plane associated therewith to be:

$i_s = 180° - i_T$ wherein $i_T$ represents the orbital inclination of the target orbital plane, $i_S$ represents the orbital inclination of the detection orbital plane, and
wherein a right ascension of ascending node of the detection orbital plane where the detection satellite is located is determined based on a right ascension of ascending node of the target orbital plane associated therewith to be:

$$\Omega_S = \begin{cases} \Omega_T + 180° & 0° \le \Omega_T < 180° \\ \Omega_T = 180° & 180° \le \Omega_T < 360° \end{cases}$$

wherein $\Omega_T$ represents the right ascension of ascending node of the target orbital plane, $\Omega_S$ represents the right ascension of ascending node of the detection orbital plane.

3. The method according to claim 1, wherein the number of the detection satellite is one.

4. The method according to claim 1, wherein a detection time of the detection satellite for each target orbital plane is no more than half of a detection period.

5. The method according to claim 4, wherein within the detection period, the detection satellite performs two approach-rendezvous detections on each satellite in each of target orbital planes at most.

6. The method according to claim 1, wherein transmitting the detection satellite from the one detection orbital plane to the other detection orbital plane in virtue of the Earth oblateness perturbation is achieved in a manner that a right ascension of ascending node of a detection orbital plane where the detection satellite is located is changed from $\Omega_{S1}$ to $\Omega_{S2}$, wherein $$\Omega_{S2} = \begin{cases} \Omega_{T2} + 180° & 0° \le \Omega_{T2} < 180° \\ \Omega_{T2} = 180° & 180° \le \Omega_{T2} < 360° \end{cases}$$

wherein $\Omega_{T2}$ represents a right ascension of ascending node of the other target orbital plane, $\Omega_{S2}$ represents a right ascension of ascending node of the other detection orbital plane where the detection satellite is located to detect satellites in the other target orbital plane, $\Omega_{S1}$ represents a right ascension of ascending node of the one detection orbital plane where the detection satellite is located to detect satellites in the one target orbital plane.

7. The method according to claim 1, wherein a daily relative change in right ascension of ascending node between a detection orbital plane where the detection satellite is located and a target orbital plane where satellites to be detected are located caused by the Earth oblateness perturbation is:

$$(\Delta\Omega_{ST})_{day} = -9.964° \times \left( \frac{\left(\frac{R_\oplus}{a_S}\right)^{\frac{7}{2}}}{\left(1 - e_S^2\right)^2} \times \cos i_S - \frac{\left(\frac{R_\oplus}{a_T}\right)^{\frac{7}{2}}}{\left(1 - e_T^2\right)^2} \times \cos i_T \right)$$

wherein $(\Delta\Omega_{ST})_{day}$ represents the daily relative change in right ascension of ascending node between the detection orbital plane where the detection satellite is located and the target orbital plane where the satellites to be detected are located, $R_\oplus$ represents a radius of the Earth, $a_S$ represents a length of a semi-major axis of the detection orbital plane where the detection satellite is located, $a_T$ represents a length of a semi-major axis of the target orbital plane where the satellites to be detected is located, $e_S$ represents an orbital eccentricity of the detection orbital plane, $e_T$ represents an orbital eccentricity of the target orbital plane, $i_T$ represents an orbital inclination of the target orbital plane, $i_S$ represents an orbital inclination of the detection orbital plane, if $(\Delta\Omega_{ST})_{day}$ is negative, the detection orbital plane where the detection satellite is located shifts westward relative to the target orbital plane where the satellites to be detected are located, if $(\Delta\Omega_{ST})_{day}$ is positive, the detection orbital plane where the detection satellite is located shifts eastward relative to the target orbital plane where the satellites to be detected are located.

8. The method according to claim 1, wherein detecting satellites of the large-scale constellation with the detection satellite comprises:
the detection satellite chasing a satellite to be detected with high dynamics,
after an attitude of the detection satellite is stable and before a detection range of the detection satellite covers the satellite to be detected, the detection satellite tracking the satellite to be detected with high dynamics in an accurate and stable manner, and
after the detection range of the detection satellite covers the satellite to be detected and the detection satellite continuously and stably tracks the satellite to be detected, the detection satellite performing detection of the satellite to be detected.

9. An apparatus for detecting satellites of a large-scale constellation through reverse-orbit rendezvous, comprising a memory and a processor, wherein
the memory is configured for storing computer-readable instructions capable of running on the processor, and
the processor is configured for performing the following steps by running the computer-readable instructions:
deploying a detection satellite to fly in one detection orbital plane in a direction opposite to a flight direction of the satellites in the large-scale constellation, so as to sequentially detect satellites flying in one target orbital plane of the large-scale constellation with the detection satellite in a manner that an approach distance between the detection satellite and a satellite being detected is within a set detection distance,
transferring the detection satellite from the one detection orbital plane to another detection orbital plane in virtue of Earth oblateness perturbation, so as to sequentially detect satellites flying in another target orbital plane of the large-scale constellation with the detection satellite in a manner that the approach distance between the detection satellite and a satellite being detected is within the set detection distance, and
stopping the detection satellite from detecting after all satellites of the large-scale constellation have been detected.

10. The apparatus according to claim 9, wherein an orbital height of a detection orbital plane where the detection satellite is located is determined based on an orbital height of a target orbital plane associated therewith to be:

$$h_S = \begin{cases} h_T + L \\ h_T - L \end{cases}$$

wherein $h_T$ represents the orbital height of the target orbital plane, $h_S$ represents the orbital height of the detection orbital plane, L represents the approach distance between the detection satellite and the satellite being detected, when the detection satellite performs approach-rendezvous detection above the satellite being detected, $h_s = h_T + L$, and when the detection satellite performs approach-rendezvous detection below the satellite being detected, $h_s = h_T - L$,
wherein an orbital inclination of the detection orbital plane where the detection satellite is located is determined based on an orbital inclination of the target orbital plane associated therewith to be:

$$i_s = 180° - i_T$$

wherein $i_T$ represents the orbital inclination of the target orbital plane, $i_S$ represents the orbital inclination of the detection orbital plane, and
wherein a right ascension of ascending node of the detection orbital plane where the detection satellite is located is determined based on a right ascension of ascending node of the target orbital plane associated therewith to be:

$$\Omega_S = \begin{cases} \Omega_T + 180° & 0° \leq \Omega_T < 180° \\ \Omega_T - 180° & 180° \leq \Omega_T < 360° \end{cases}$$

wherein $\Omega_T$ represents the right ascension of ascending node of the target orbital plane, $\Omega_S$ represents the right ascension of ascending node of the detection orbital plane.

11. The apparatus according to claim 9, wherein the number of the detection satellite is one.

12. The apparatus according to claim 9, wherein a detection time of the detection satellite for each target orbital plane is no more than half of a detection period.

13. The apparatus according to claim 12, wherein within the detection period, the detection satellite performs two approach-rendezvous detections on each satellite in each of target orbital planes at most.

14. The apparatus according to claim 9, wherein transmitting the detection satellite from the one detection orbital plane to the other detection orbital plane in virtue of the Earth oblateness perturbation is achieved in a manner that a right ascension of ascending node of a detection orbital plane where the detection satellite is located is changed from $\Omega_{S1}$ to $\Omega_{S2}$, wherein $$\Omega_{S2} = \begin{cases} \Omega_{T2} + 180° & 0° \leq \Omega_{T2} < 180° \\ \Omega_{T2} - 180° & 180° \leq \Omega_{T2} < 360° \end{cases}$$

wherein $\Omega_{T2}$ represents a right ascension of ascending node of the other target orbital plane, $\Omega_{S2}$ represents a right ascension of ascending node of the other detection orbital plane where the detection satellite is located to detect satellites in the other target orbital plane, $\Omega_{S1}$ represents a right ascension of ascending node of the one detection orbital plane where the detection satellite is located to detect satellites in the one target orbital plane.

15. The apparatus according to claim 9, wherein a daily relative change in right ascension of ascending node between a detection orbital plane where the detection satellite is located and a target orbital plane where satellites to be detected are located caused by the Earth oblateness perturbation is:

$$(\Delta \Omega_{ST})_{day} = -9.964° \times \left( \frac{\left(\frac{R_\oplus}{a_S}\right)^{\frac{7}{2}}}{\left(1 - e_S^2\right)^2} \times \cos i_S - \frac{\left(\frac{R_\oplus}{a_T}\right)^{\frac{7}{2}}}{\left(1 - e_T^2\right)^2} \times \cos i_T \right)$$

wherein $(\Delta \Omega_{ST})_{day}$ represents the daily relative change in right ascension of ascending node between the detection orbital plane where the detection satellite is located and the target orbital plane where the satellites to be detected are located, $R_\oplus$ represents a radius of the Earth, $a_S$ represents a length of a semi-major axis of the detection orbital plane where the detection satellite is located, $a_T$ represents a length of a semi-major axis of the target orbital plane where the satellites to be detected is located, $e_S$ represents an orbital eccentricity of the detection orbital plane, $e_T$ represents an orbital eccentricity of the target orbital plane, $i_T$ represents an orbital inclination of the target orbital plane, $i_S$ represents an orbital inclination of the detection orbital plane, if $(\Delta\Omega_{ST})_{day}$ is negative, the detection orbital plane where the detection satellite is located shifts westward relative to the target orbital plane where the satellites to be detected are located, if $(\Delta\Omega_{ST})_{day}$ is positive, the detection orbital plane where the detection satellite is located shifts eastward relative to the target orbital plane where the satellites to be detected are located.

16. The apparatus according to claim 9, wherein detecting satellites of the large-scale constellation with the detection satellite comprises:
  the detection satellite chasing a satellite to be detected with high dynamics,
  after an attitude of the detection satellite is stable and before a detection range of the detection satellite covers the satellite to be detected, the detection satellite tracking the satellite to be detected with high dynamics in an accurate and stable manner, and
  after the detection range of the detection satellite covers the satellite to be detected and the detection satellite continuously and stably tracks the satellite to be detected, the detection satellite performing detection of the satellite to be detected.

17. A non-transitory storage medium having stored thereon computer-readable instructions that, when executed by a processor, cause the processor to perform a method for detecting satellites of a large-scale constellation through reverse-orbit rendezvous, the method comprising:
  deploying a detection satellite to fly in one detection orbital plane in a direction opposite to a flight direction of the satellites in the large-scale constellation, so as to sequentially detect satellites flying in one target orbital plane of the large-scale constellation with the detection satellite in a manner that an approach distance between the detection satellite and a satellite being detected is within a set detection distance,
  transferring the detection satellite from the one detection orbital plane to another detection orbital plane in virtue of Earth oblateness perturbation, so as to sequentially detect satellites flying in another target orbital plane of the large-scale constellation with the detection satellite in a manner that the approach distance between the detection satellite and a satellite being detected is within the set detection distance, and
  stopping the detection satellite from detecting after all satellites of the large-scale constellation have been detected.

18. The non-transitory storage medium according to claim 17, wherein an orbital height of a detection orbital plane where the detection satellite is located is determined based on an orbital height of a target orbital plane associated therewith to be:

$$h_S = \begin{cases} h_T + L \\ h_T - L \end{cases}$$

wherein $h_T$ represents the orbital height of the target orbital plane, $h_S$ represents the orbital height of the detection orbital plane, L represents the approach distance between the detection satellite and the satellite being detected, when the detection satellite performs approach-rendezvous detection above the satellite being detected, $h_s = h_T + L$, and when the detection satellite performs approach-rendezvous detection below the satellite being detected, $h_s = h_T - L$, wherein an orbital inclination of the detection orbital plane where the detection satellite is located is determined based on an orbital inclination of the target orbital plane associated therewith to be:

$i_S = 180° - i_T$ wherein $i_T$ represents the orbital inclination of the target orbital plane, $i_S$ represents the orbital inclination of the detection orbital plane, and wherein a right ascension of ascending node of the detection orbital plane where the detection satellite is located is determined based on a right ascension of ascending node of the target orbital plane associated therewith to be:

$$\Omega_S = \begin{cases} \Omega_T + 180° & 0° \leq \Omega_T < 180° \\ \Omega_T = 180° & 180° \leq \Omega_T < 360° \end{cases}$$

wherein $\Omega_T$ represents the right ascension of ascending node of the target orbital plane, $\Omega_S$ represents the right ascension of ascending node of the detection orbital plane.

19. The non-transitory storage medium according to claim 17, wherein the number of the detection satellite is one.

20. The non-transitory storage medium according to claim 17, wherein a detection time of the detection satellite for each target orbital plane is no more than half of a detection period.

* * * * *